US010389598B2

(12) United States Patent
Padala et al.

(10) Patent No.: US 10,389,598 B2
(45) Date of Patent: Aug. 20, 2019

(54) CONTAINER MANAGEMENT AND APPLICATION INGESTION ENGINE

(71) Applicant: CISCO TECHNOLOGY, INC., San Jose, CA (US)

(72) Inventors: Pradeep Padala, San Jose, CA (US); Selvi Kadirvel, Mountain View, CA (US); Himanshu Raj, Cupertino, CA (US); Kiran Kamity, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 15/336,360

(22) Filed: Oct. 27, 2016

(65) Prior Publication Data

US 2017/0126432 A1    May 4, 2017

Related U.S. Application Data

(60) Provisional application No. 62/248,002, filed on Oct. 29, 2015.

(51) Int. Cl.
*G06F 9/50* (2006.01)
*H04L 12/24* (2006.01)
(Continued)

(52) U.S. Cl.
CPC ............ *H04L 41/14* (2013.01); *G06F 9/5077* (2013.01); *G06F 9/5083* (2013.01);
(Continued)

(58) Field of Classification Search
CPC ...... H04L 41/14; H04L 41/0803; H04L 43/16
See application file for complete search history.

(56) References Cited

U.S. PATENT DOCUMENTS 8,667,500 B1 *  3/2014  Ji .......................... G06F 9/5077
                                                         718/102
8,978,035 B2    3/2015  McGrath et al.
(Continued)

FOREIGN PATENT DOCUMENTS

WO    WO 2015197564 A1 * 12/2015  .......... G06F 9/5088

OTHER PUBLICATIONS www.saylor.org, Introductory Statistics, 2012, p. 55. [online], [retrieved on Jul. 6, 2018], Retreived form the Internet: < URL : https://www.saylor.org/site/textbooks/Introductory%20Statistics.pdf> Licencing information: <URL: https://saylordotorg.github.io/text_introductory-statistics/s00-license.html>.*

(Continued)

*Primary Examiner* — George C Neurauter, Jr.

(57) ABSTRACT

In one embodiment, a system has host machines forming a cluster. Each host machine runs containers, where each container includes a segment of hardware resources associated with the host machine, a segment of an operating system utilized by the host machine, and at least one application. Host agents operate on the host machines. Each host agent collects operational parameters associated with the containers on each host machine. A management platform is operative to divide the cluster into container pools, where each container pool includes a sub-set of computation resources in the cluster and has associated container pool metrics including a priority level and computation resource limits. Operational parameters are collected from the host agents. The operational parameters are evaluated in accordance with the container pool metrics.

23 Claims, 5 Drawing Sheets

(51) Int. Cl.
*H04L 12/26* (2006.01)
*H04L 12/46* (2006.01)
*H04L 29/08* (2006.01)

(52) U.S. Cl.
CPC ........ *H04L 12/4641* (2013.01); *H04L 41/046* (2013.01); *H04L 41/0803* (2013.01); *H04L 41/0806* (2013.01); *H04L 41/0893* (2013.01); *H04L 43/08* (2013.01); *H04L 43/0876* (2013.01); *H04L 43/16* (2013.01); *H04L 67/10* (2013.01)

(56) References Cited

U.S. PATENT DOCUMENTS

| | | | |
|---|---|---|---|
| 9,164,808 | B2 | 10/2015 | Parker |
| 9,276,816 | B1 | 3/2016 | Conte et al. |
| 9,692,666 | B2 * | 6/2017 | Salokanto ........... H04L 41/5054 |
| 2004/0264481 | A1 * | 12/2004 | Darling ................. H04L 29/06 370/401 |
| 2008/0244600 | A1 | 10/2008 | Wong et al. |
| 2009/0210455 | A1 * | 8/2009 | Sarkar ................. G06F 11/2038 |
| 2010/0064299 | A1 | 3/2010 | Kacin et al. |
| 2011/0035755 | A1 | 2/2011 | Huang et al. |
| 2011/0191788 | A1 | 8/2011 | Jacobson et al. |
| 2012/0054763 | A1 * | 3/2012 | Srinivasan ............ G06F 9/5005 718/104 |
| 2014/0317261 | A1 | 10/2014 | Shatzkamer et al. |
| 2014/0317293 | A1 | 10/2014 | Shatzkamer |
| 2015/0268865 | A1 * | 9/2015 | Masrani ................ G06F 3/0608 711/114 |
| 2016/0092277 | A1 * | 3/2016 | Crowell .............. G06F 9/45558 718/1 |
| 2016/0182315 | A1 | 6/2016 | Salokanto et al. |
| 2016/0205518 | A1 | 7/2016 | Patel et al. |
| 2016/0330277 | A1 | 11/2016 | Jain et al. |
| 2017/0063722 | A1 * | 3/2017 | Cropper ................. H04L 47/82 |
| 2017/0257424 | A1 | 9/2017 | Neogi et al. |

OTHER PUBLICATIONS

U.S. Appl. No. 15/346,183, filed Nov. 8, 2016, entitled "Container Management and Application Ingestion Engine," Inventor(s): Pradeep Padala, et al.

Microsoft, "Windows Containers Quick Start," retrieved and printed on Oct. 10, 2016, 2 pages.

* cited by examiner

CONTAINER MANAGEMENT AND APPLICATION INGESTION ENGINE

PRIORITY DATA

This is a non-provisional patent application receiving benefit from U.S. Provisional Patent Application, entitled APPARATUS AND METHOD FOR MANAGING CONTAINERS ON COMPUTER CLUSTERS UTILIZING HOST AGENTS AND A MANAGEMENT PLATFORM (filed on Oct. 29, 2015, Ser. No. 62/248,002). The U.S. Provisional Patent Application is hereby incorporated by reference in its entirety.

TECHNICAL FIELD

The present disclosure relates generally to the virtualization of computer resources using containers. More particularly, this disclosure relates to techniques for managing containers on computer clusters utilizing host agents and a management platform.

BACKGROUND OF THE DISCLOSURE

Computer resources are virtualized using either a hypervisor or a container. In the case of a hypervisor a full operating system is executed on top of a host operating system. That is, a host operating system runs a hypervisor that manages different virtual machines. Each virtual machine may utilize a different operating system.

Container-based virtualization is sometimes referred to as operating system virtualization. Instead of trying to run an entire guest operating system, container virtualization isolates the processes utilizing the host operating system. Each container corresponds to each virtual environment. The operating system provides process isolation between virtual environments and performs resource management. That is, the operating system designates for each process, i.e., each virtual environment or each container, its own filesystem, memory and devices.

Container-based virtualization has advantages when large numbers (e.g., hundreds) of guests or containers are deployed. On the other hand, there are numerous challenges associated with container-based virtualization. For example, one rogue container can consume all memory and crash an entire host and the other containers executing on it. Even if a system does not crash from a rogue container, the rogue container can consume all CPU cycles and thereby starve all other containers. Containers may also result in an underutilized data center. Reallocating resources across a data center can be difficult. Finally, there are challenges in scaling out container resources.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system has host machines forming a cluster. Each host machine runs containers, where each container includes a segment of hardware resources associated with the host machine, a segment of an operating system utilized by the host machine, and at least one application. Host agents operate on the host machines. Each host agent collects operational parameters associated with the containers on each host machine. A management platform is operative to divide the cluster into container pools, where each container pool includes a sub-set of computation resources in the cluster and has associated container pool metrics including a priority level and computation resource limits. Operational parameters are collected from the host agents. The operational parameters are evaluated in accordance with the container pool metrics. Commands are issued to the host agents, where the commands include operating system commands enforced at a container to facilitate operation of the cluster in accordance with the container pool metrics.

Containers are not to be confused with virtual machines. As understood by one skilled in the art, a container-based virtualization enables applications or software to run reliably, in the same manner, regardless of the environment. A container packages hardware resources, an operating system, and at least one application executing on the operating system. The operating system can be shared with other containers. Note that containers are not virtual machines. Virtual machines do not share operating systems. Rather, containers are virtualized applications which can be isolated from other containers on the same operating system. Because containers are not virtual machines, and are relatively much more "light weight" compared to virtual machines, there can be hundreds or thousands of containers in a cluster. Containers poses unique challenges when it comes to management of containers. Some of these unique challenges and solutions to those unique challenges are described herein.

Figure 1:
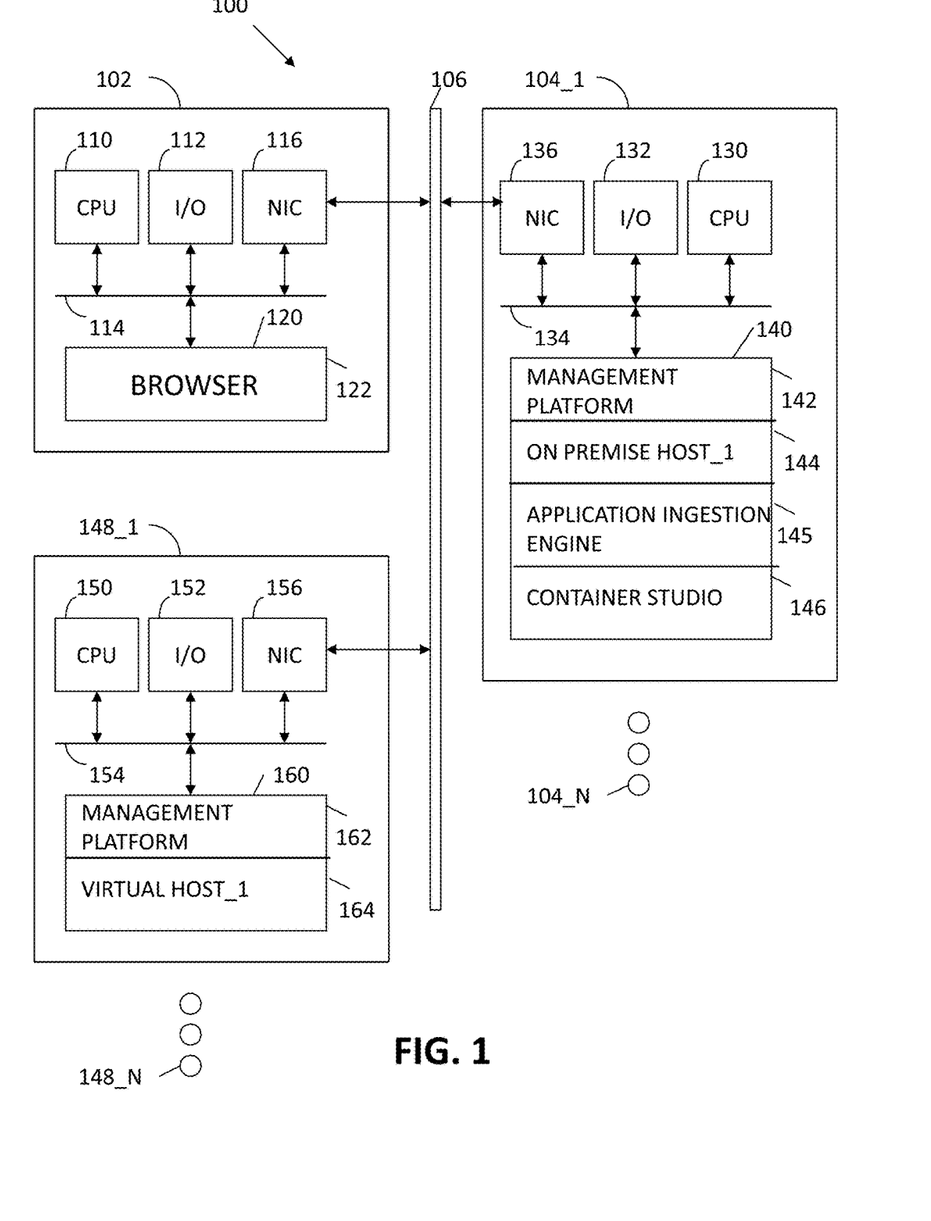
FIG. 1 illustrates a system configured in accordance with some embodiments of the disclosure.

FIG. 1 illustrates a system 100 configured in accordance with an embodiment of the disclosure. The system 100 includes a client device 102, which communicates with on premise host servers 104_1 through 104_N via a network 106, which may be any combination of wired and wireless networks. Also connected to the network 106 are virtual hosts 148_1 through 148_N, for example forming a collection of virtualized cloud resources provisioned by a third-party.

The client device 102 may be a computer, tablet, smartphone and the like. The client device 102 has computing components, such as a central processing unit 110 and input/output devices 112 connected via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores one or more executable programs, such as a browser 122, which may be used to access a server connected to network 106.

Each on premise host server 104 also includes computing components, such as a central processing unit 130, input/output devices 132, a bus 134, and a network interface circuit 136. A memory 140 is also connected to the bus 134. The memory 140 stores instructions executed by the central processing unit 130 to implement operations disclosed herein. In one embodiment, the memory 140 stores a management platform 142 that operates with host agents to manage all containers executed on the on premise servers 104. The memory 140 also stores an on premise host 144. The on premise host 144 includes an operating system and hosting functions characterized herein. There are multiple hosts on premise; that is, there are multiple hosts operating on servers 104_1 through 104_N.

Cloud server 148_1 also includes computing components, such as a central processing unit 150, input/output devices 152, a bus 154 and a network interface card 156. A memory 160 is connected to the bus 154. The memory 160 stores instructions that are executed by the central processing unit 150 to implement operations of the disclosure. In particular, the memory 160 stores a management platform 162, which operates with host agents to manage all containers executed on the cloud servers 148_1 through 148_N. The memory 160 also stores a virtual host 164. The virtual host 164 includes an operating system and hosting functions characterized herein. There are multiple hosts operating on servers 148_1 through 148_N associated with the cloud resource.

Figure 2:
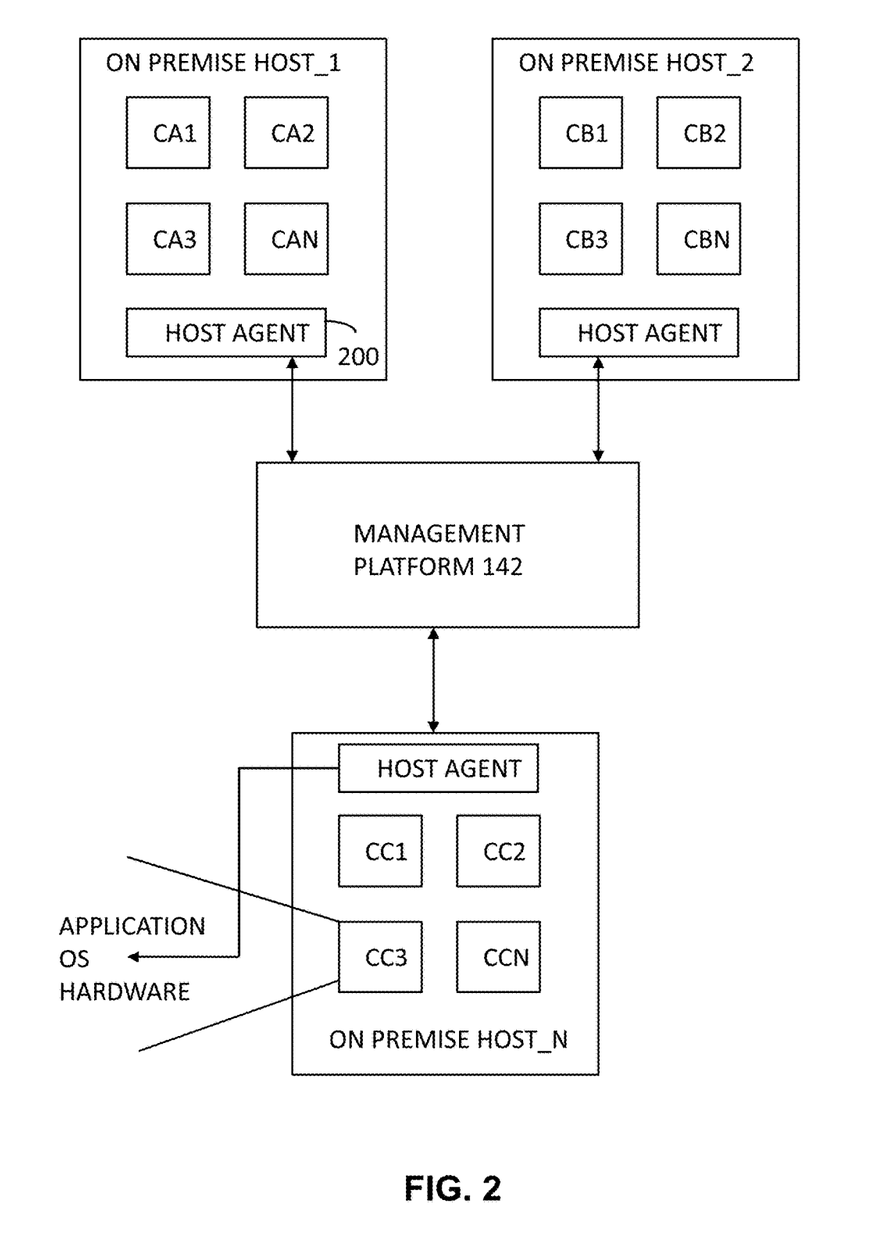
FIG. 2 illustrates component interactions utilized in accordance with some embodiments of the disclosure.

FIG. 2 illustrates component interactions in accordance with an embodiment of the disclosure. In particular, FIG. 2 illustrates on premise host_1 that is hosting containers CA1 through CAN. Host_1 has an associated host agent 200, which communicates with the management platform 142. On premise host_2 has a similar configuration, as does on premise host_N. On premise host_2 hosts containers CB1 through CBN. On premise host_N hosts containers CC1 through CCN. As shown in FIG. 2, each container comprises hardware resources, an operating system and at least one application executing on the operating system. The same operating system is used for all containers. As discussed in detail below, the host agent communicates with the operating system to manage each container.

Figure 3:
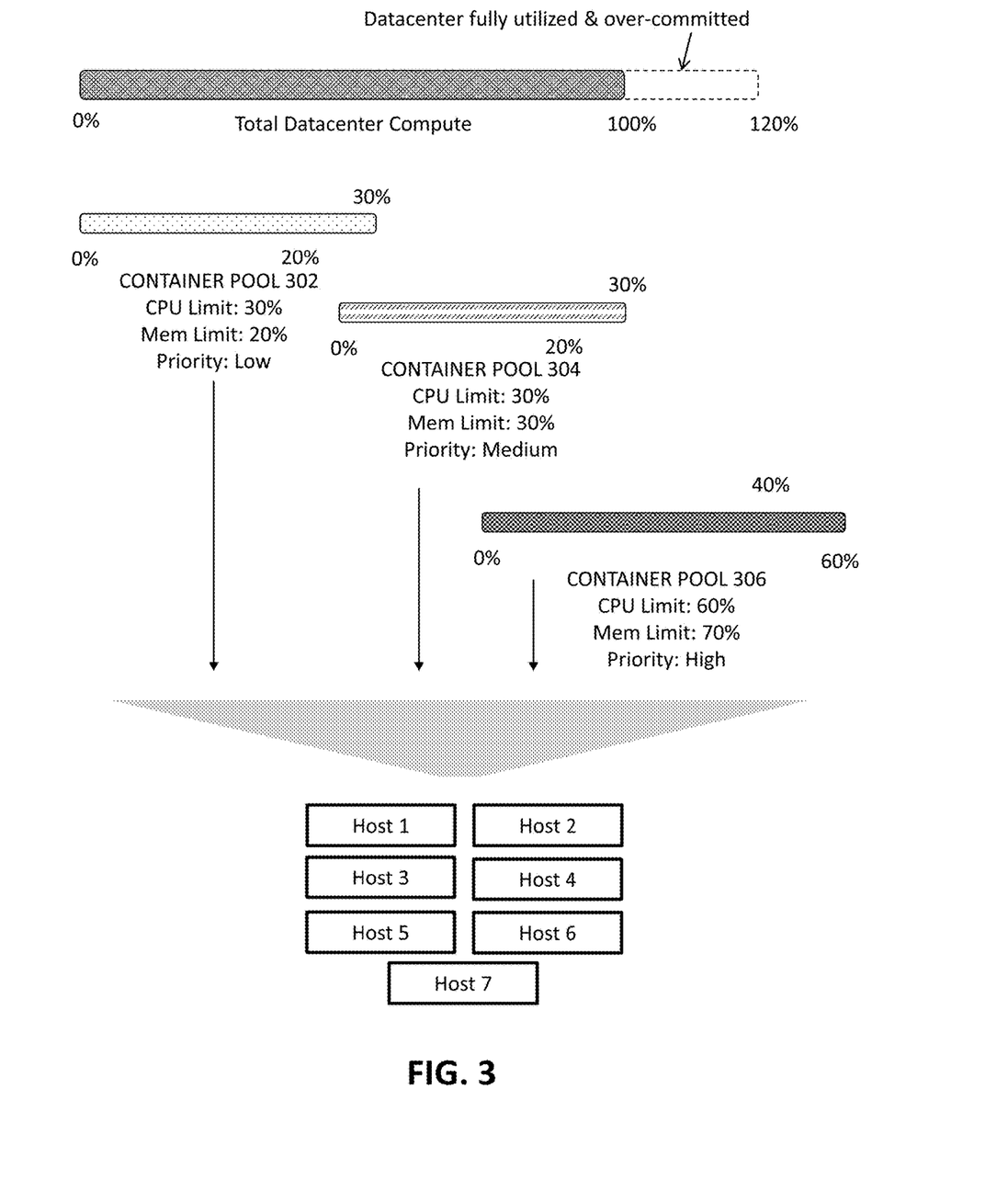
FIG. 3 illustrates resource allocation utilized in accordance with some embodiments of the disclosure.

The foregoing architecture may be used to virtualize a set of resources, as shown in FIG. 3. In particular, FIG. 3 illustrates a set of hosts (Host 1 through Host 7) that are treated as a common pool of resources. The hosts operate as a cluster or data center.

The top of FIG. 3 shows data center utilization. As shown, the disclosure allows for full utilization of the data center, including over-committed utilization. Data center utilization is governed by concepts of limits and priorities. In particular, resource limits and priorities are set. The resource limits and priorities are the two factors that govern management of the containers. Limits and priorities can be set for individual containers. More interestingly, limits and priorities can be set for a group of containers. A group of containers are called a slice or a pool herein. In this example, container pool/slice 302 is set to a low priority with a CPU limit of 30% of all resources and a memory limit of 20% of all resources (i.e., Host 1 through Host N). A container pool/slice 304 is set to a medium priority and is granted a CPU limit of 30% of all resources and a memory limit of 30% of all resources. Finally, container pool/slice 306 is set to a high priority and is granted a CPU limit of 60% of all resources and a memory limit of 70% of all resources. Note here that the CPU limits add up to 120% utilization of data center resources (30%+30%+60%). Similarly, the memory limits add up to 120% utilization of data center resources (20%+30%+70%). This over-subscribing of limits facilitates full utilization of a cluster of resources. As discussed below, other controls preclude actual over commitment of resources.

The management platform 142 is a software environment that provides the capability for an enterprise to manage container based applications running in either a bare-metal (e.g., physical/on premise data center) or virtual/cloud-based (e.g., Amazon Web Services) environment. The platform provides additional container-specific management capabilities not available in current state-of-the-art technologies. These capabilities include:

Representing resources used by containers as a cluster of available resources (for example, as shown in FIG. 3)

Further subdividing clusters into sub-clusters, which are referred to herein as a container pools or slices Adjusting container pool resource usage based on administrator-configurable policy (for example, as shown in FIG. 3)

Enforcing container placement into container pools based on administrator-configurable policy Continually evaluating cluster and slice resource utilization and resource availability, and adjusting preferences for container resource usage based on parameters supplied by the administrator (this can include container-balancing on a cluster of hosts)

Grouping containers and isolating the resources they use based on tenancy

Isolation of compute resources

Isolation of network resources

Isolation of storage resources

The management platform 142 internally represents a cluster of computing resources (CPU, network, and storage) as a data center entity. Data center entities are initially created in the platform in an empty state; computing resources are subsequently added to the data center entity after creation (although for convenience sake, the administrator may choose to supply an initial set of computing resources during creation).

In one embodiment, the management platform 142 supports the following abstract cluster or data center types:

Physical (on premise) data center A physical data center comprises one or more physical hosts. Each physical data center may contain definitions for one or more physical networks, which define connectivity to the external network.

Cloud based data center A cloud based data center is a data center whose computing resources are provided by a cloud infrastructure provider (Amazon Web Services, Microsoft Azure, etc.). Each cloud data center may contain definitions for one or more virtual networks, which define connectivity to the external network.

Each type of data center contains three types of computing resources Each type of resource can be added or removed after data center creation time. For physical data center, the following resource types are available:

Physical Hosts (PHosts)—PHosts are physical hosts (e.g., rack-mounted servers or blades). PHosts are computing resources and provide the computational power of the data center. The usage metric of a PHost is defined by its RAM and CPU capacity (e.g., GHz).

Physical Networks (PNets)—PNets are physical networks that model the connection from a physical host to a network. PNet usage is defined by bandwidth in/out of the PNet.

NFS Storage Locations—NFS storage locations provide a persistent storage location for container data volumes used by containers running in a physical datacenter.

NFS storage usage is defined by the current and maximum amount of storage used/available (e.g., in GB).

For cloud based data center, the following resource types are available:

Virtual Hosts (VHosts)—VHosts are virtual machines running in the cloud data center being used. VHosts are computing resources and provide the computational power of the data center. VHosts are created in the cloud on demand and are added to the data center as desired by the administrator. The usage metric of a VHost is defined by a neutral CPU speed metric, normalized for all VHosts.

Virtual Networks (VNets)—VNets are virtual networks that model the connection from a virtual host to a network. VNet usage is defined by bandwidth in/out of the VNet.

Cloud Storage Locations—Cloud storage locations provide a persistent storage location (e.g., a persistent cloud data volume) for container data volumes used by containers running in a cloud data center. Cloud storage usage is defined by the current and maximum amount of storage used/available (e.g., in GB).

In addition to the preceding resource types, both physical and cloud data center provide an additional resource type:

Container Networks (CNets)—CNets define an inter-container network that is used to join multi-container applications together. CNets are virtual/ephemeral networks that provide the intercommunication glue between containers.

Each cluster or data center is further subdivided into one or more container pools or slices. Illustrative container pools/slices are illustrated in FIG. 3. A container pool or slice is a logical partitioning of the resources available in a data center, subject to certain limiting rules enforced by the management platform:

Resource limit—The absolute resource limit for a specific slice, for a given resource in the underlying data center's resource pool Resource priority—The priority the slice should be given when competing with other slices for resources in the underlying data center's resource pool As shown in FIG. 3, multiple container pools/slices can be defined for a given data center, each with its own set of limits and priorities. Each pool/slice competes for resources based on these attributes. As the workload in the data center increases and decreases over time, pool/slice resource utilization is managed and enforced in real time.

A key feature of the management platform 142 is the ability to enforce these slice limits and priorities in both types of data center environments (physical and cloud-based), and for each type of resource (hosts, networks, and storage). To accomplish this, the management platform 142 employs the software host agent 200 running on each PHost/VHost. The host agent 200 has the following responsibilities:

Periodically querying the management platform 142 for updated resource limit definitions (e.g., those limits and priorities assigned by the system administrator)

Ascertaining the desired resource target based on current and past utilization

Applying any corrective measures required to achieve the resource target

Communicating the new level of resource utilization to the management platform 142

This information is used by other hosts to determine overall pool/slice resource utilization, as well as to provide a historical view of resource usage over time.

The above process is performed separately on each host in a data center. As each node has no direct knowledge of resource utilization on other peer hosts, each host is required to communicate its level of resource utilization periodically to the management platform 142. With each hosts level of resource utilization centrally obtainable, each node can make appropriate determinations as to which local resource utilization target is appropriate. To avoid a feedback loop or self-reinforcing resource limitation occurring, hysteresis correction is applied by each node (e.g., by varying refresh rates and/or altering the amount by which resource utilization is corrected on each iteration). For example, such a correction would occur when a container or set of containers was previously resource constrained, but is suddenly presented with an underutilized resource pool. The hysteresis correction here would "bump up" the resource limits to account for the new availability.

Each resource type is individually managed; the per-agent host performs the workflow defined above for compute resources (RAM and CPU), network resources (network bandwidth) and storage volumes (bytes stored). For each type of resource, different underlying system primitives are used to enforce the limits. For example, operating system cgroups can be used to limit the aggregate amount of CPU time a container process is allowed to accumulate. Similarly, network bandwidth can be artificially throttled at the operating system level to reduce a slice's network utilization (if the slice was required for some reason to reduce its network utilization).

Note that addition or deletion of data center resources (e.g., adding or removing a host) may affect the decisions made by each host while processing the workflow outlined above. This is perfectly valid and expected behavior.

For the sake of completeness, it should be noted that the heuristics and rules used to determine resource utilization in the above workflows can be specified or replaced by the administrator at any time.

A key feature of the management platform 142 is resource isolation. Isolating data center resources confers the ability to host multiple distinct workloads using the same underlying hardware (multi tenancy). The management platform provides resource isolation using the following approaches:

Compute (CPU/RAM) resource isolation is enforced by the container runtime (e.g., Docker) and the underlying Operating System Network resource isolation is enforced by the PNet/VNet/CNet abstractions, and the underlying implementation of these abstractions (e.g., VLANs and/or VXLANs)

Storage resource isolation is provided by host-specific software modules (storage plugins) that provide encapsulation of data volumes into discrete disk files or locations By isolating resources as outlined above, the management platform provides the administrator the ability to host multiple customer workloads on the same set of underlying data center hardware. While not all enterprises need to run multiple customer workloads, it is envisioned that the multi tenancy capabilities of the management platform as outlined above will be used by most enterprises to provide cross-function or cross-business unit workload separation (e.g., an in-house, same-company multi tenancy approach).

Managing resources consumed by containers is an important feature of the management platform. Without resource limitation, a runaway container can consume all the resources on a machine (as typically containers run as user accounts with no resource limits). By placing an external limitation on the resources used by a container, the management platform can avoid having a runaway scenario crash the machine or other containers.

Periodically, each host 200 gathers its own usage information via some OS-specific means (e.g., querying OS performance counters or other statistics gathering mechanisms specific to the OS). This usage information is appended to a time series database running in the management platform which acts as a gathering point for usage details over time.

Concurrently, the management platform 142 periodically queries the time series database and applies the aforementioned heuristics on the data stored there to determine which, if any, containers need to have their resource limits adjusted. Upon determining that a specific container or containers need to have a resource adjustment applied, the management platform 142 communicates this need to the host agent 200 software running on the host executing the affected container(s). The host agent then makes a local adjustment to the container resource limits using some OS-specific mechanism (e.g., by manipulating cgroups on Linux or Job objects on Windows).

To prevent transient resource usage spikes from adversely affecting the performance of containers on a host, the management platform employs the following additional safeguards when running containers. These safeguards are needed as it could be otherwise possible for a burst of activity to occur in the interim time between the last heuristic application of the management platform and the present:

Sensitive containers (such as those containers running the management platform itself) are run using separate user accounts with different resource limitations not subject to the heuristic described previously.

The per-user OS resource limits for the user account running the containers is artificially lowered to help prevent runaway containers from adversely affecting containers in other slices, and each slice is run using a different user account.

Limiting the per-user OS resource limits does not guarantee that a runaway container cannot exceed the per-user limits. Rather, it reduces the potential for this scenario to occur. Specifically, it prevents a runaway container from adversely affecting other pools/slices.

As an example, consider two containers A and B running on a host H. Container A is a member of pool/slice S1, whose priority is higher than that of container B, which is running in pool/slice S2. This means that if there is ever any contention for resources, container A will be granted a larger share of resources (by virtue of container A being a member of pool/slice S1). Assume further that the resource limit of each slice S1 and S2 are both 100% (e.g., in the absence of competition, both pool/slice's containers will use all available resources). Finally, the type of resource in question here is irrelevant (either CPU, memory, or any other resource may be envisioned).

Assume at time t=0, both container A and B are performing idle work, and are only each consuming 20% of the available resource. As there is no competition for resources here, and neither slice has exceeded their resource limit, no corrective action is needed.

Assume next at time t=1, container B has begun to process a large workload. In the absence of competition from container A (specifically, any containers in pool/slice S1), container B is permitted to use the remaining 60% (for a total of 80%) of the resource. Still, no corrective action is needed.

Assume next at time t=2, container B is still processing its large workload, and container A begins processing a similar large workload. During the next management platform resource limitation iteration, the management platform 142 communicates a resource limiting request to the host agent 200 where container B is running, indicating that a resource reduction is required. The management platform determines this need by analyzing the data stored in the time series database to determine that container A has consumed all of the remaining available resource (in this case, 20%) and has started to grow its need (by, e.g., suddenly jumping to 25% utilization). Over time, the host agent on the host running container B will adjust via some OS-specific primitives (e.g., cgroups on Linux or Job objects on Windows) the maximum resource consumption permitted by container B. This reduction will continue using some prioritization algorithm (for example, "reduce resource utilization 1% per minute" or "reduce resource utilization according to some function" or "reduce resource utilization by 50% immediately") until one or both containers reduce their workload requirements, or the balance imposed by the relative priorities of the two slices involved is achieved.

It should be obvious to the reader that the precise resource limiting algorithm and quantization method used above can be generalized to any desired algorithm. In other words, the implementation is not dependent on any specific prioritization algorithm chosen.

A feedback loop of monitoring, analysis, decision-making and execution is repeated continuously to keep resource usage by containers (running across multiple hosts) within user-specified requirements. A third-party software tool (e.g., cAdvisor) is used on each host to monitor resource usage metrics such as CPU usage and memory usage. On Linux hosts, these metrics are retrieved from a cgroups file present in the cgroups filesystem hierarchy. These metrics are periodically reported to a central time-series database. The SDDC (Software Defined Data Center) component of the management platform 142 retrieves these metrics from the time-series database using a REST API, post-processes the metrics (e.g., calculation of averages, derivatives, etc.) and then uses them as input to the limits-enforcement algorithm. The limits enforcement algorithm also receives user-specified limits and priorities for each container pool (or slice). The algorithm uses these two sets of inputs to determine constraints to be placed on each container's resources. These constraints are communicated to the host agent (a piece of software) running on each host, using a RPC-like network API. The host agent puts into effect these constraints by altering the limits contained in the cgroups filesystem. For example, to constrain CPU usage, the host agent will read from and write to /sys/fs/cgroup/cpu/docker/*.

Another embodiment of the disclosure relates to container placement and balancing based upon limits and priorities. In a multi-host setup, the container platform has to decide which containers run on which hosts (physical or virtual hosts). Currently, container orchestration products use various algorithms to decide which containers get placed where. There are two aspects of the placement—one is the initial placement which determines which containers run where, and the other is balancing (or re-balancing) when after the system has been operational for a while. It can decide to move containers to different hosts because some of the hosts might have a lot of containers running in them, whereas other hosts may not have much running on them. That is, the system may get out-of-balance. With the disclosed technology, limits and priorities are set per container pool (or slice). These limits and priority can be used for both placement and balancing. That is, new placement and balancing of containers is guided by the specified container pool priorities and limits.

Besides enforcing limits and priorities on containers and container pools/slices, the management platform 142 can intelligently monitor containers and container pools/slices for imbalance. Container orchestration engines (such as Swarm, Kubernetes and Mesos) only provide functionality for initial placement of containers on a set of hosts (where hosts can be virtual machines or bare-metal servers). Initial placement refers to the event when a container is initially scheduled to execute on a cluster. The container orchestration engine determines the ideal host for the container based on current (static) load conditions. Some of the commonly available placement strategies include: spread, random and bin-packing. Spread and binpack strategies, e.g., for Swarm, compute rank according to a nodes's available CPU, its RAM, and the number of containers the node has. In particular, Swarm optimizes for a node with a least number of containers, thereby spreading containers across many nodes. Binpack optimizes for the node which is most packed, thereby reducing fragmentation. The Random strategy, e.g., for Swarm, uses no computation and selects a node at random.

However, over a period of time, resource utilization on these hosts tends to become unbalanced because of varying resource usage and lifetime of different containers. The consequence of unbalanced host utilization is that some containers will be unnecessarily capped by host capacity. This necessitates the need for a container-balancing algorithm. This invention proposes such a container-balancing algorithm (outlined below) that aims at reducing imbalance in the resource utilization of hosts within a cluster. Such an algorithm is applicable when spread and random initial placement strategies are used. Bin-packing placement strategies intentionally aim at maximizing resource usage on some nodes while minimizing resource usage on the remaining hosts and as a result container-balancing is not needed. Initial placement strategies (that are available in container orchestration engines) use a container's static resource limits to make placement decisions, while the container-balancing described herein uses real-time resource usage metrics to make appropriate balancing decisions (i.e., deciding on whether to move containers to achieve a balanced cluster).

Container-Balancing Scheme
Configurable inputs:
  n: number of hosts in a cluster
  k: maximum number of containers that will be considered for stop/restart
  i: interval at which the container-balancing algorithm is invoked
  threshold: maximum load imbalance value of a cluster beyond which container rebalancing is initiated
  balanceReplicatedContainers (true|false): If true, only replicated containers are considered to be stopped/restarted on different hosts. If false, all containers will be considered.
Steps:
  1. Monitor host resource (such as CPU, Memory) usage for an interval i for all hosts in a cluster.
  2. Determine if resource usage imbalance exists on this cluster.
    a. For each node (i.e., host) find its resource usage deviation, where:

deviation=host usage−average host usage of cluster where the average host usage of cluster being, for example, median, percentile measure, or mean (e.g., sum of all host usage of CPU divided by the number of host machines)
    b. Imbalance value=$(1/n)*$(sum of squares of resource usage deviations), where n is the number of hosts in a cluster. If imbalance value is greater than ">" threshold, consider stopping and then restarting top k number of the containers on this host on a lightly-loaded host (moving top K number of containers from a source host S to a lightly-loaded destination host D).
    c. Choose a source host S with the maximum value for resource usage deviation from which a container will be selected for balancing.
  3. On host S, choose top k number of containers $\{C1 \ldots Ck\}$ with maximum resource usage. Depending on a configurable user property, consider only containers that have replicas greater than ">" 1 (i.e., containers which have more than one replicas). This ensures that the service (provided by this container) is able to withstand a short period of downtime via a possible performance degradation during the migration to rebalance the cluster.
  4. Determine the destination host D for chosen containers $\{C1 \ldots Ck\}$.
    a. Host D is chosen as the most lightly-loaded node in the cluster, i.e., it has less or minimum resource usage deviation.
    b. Recalculate cluster imbalance, i.e., evaluate new imbalance value (using the equation above) as if the top K number of containers $\{C1 \ldots Ck\}$ are moved to host D.
    c. If cluster imbalance will improve (e.g., determine whether the new imbalance value improves over the previously calculated imbalance value, or whether the new imbalance value is lower than the previously calculated imbalance value)
      i. Check which subset of containers, $Cs \subset \{C1 \ldots Ck\}$ has all its placement constraints satisfied by host D.
      ii. If $|Cs|>=1$ (e.g. the number of containers in Cs is greater than or equal to 1, or at least one), stop and restart all the containers in Cs (one or more containers in Cs) on host D. Else, subset Cs is empty; choose D to be the next lightly-loaded host in the cluster (another host machine). Go to Step 4b.
    d. If cluster imbalance will not improve, consider top k−1 containers to be stopped on the source host S and restarted on destination host D. Go to Step 4a. Henceforth, k=k−1.

Container-balancing is not to be construed to be related or the same as virtual machine balancing. Virtual machines (VMs) can be live migrated without any downtime, whereas containers need to be stopped on the source host and restarted on a target host. If the container belongs to a set of replicas of a specific service, then the service can experience some performance degradation during the period when number of replicas is reduced. However, performance degradation may be acceptable since container orchestration engines only guarantee that the number of replicas will be maintained over time. This unique feature associated with containers provides an option for users to specify the types of containers that can be stopped and restarted (i.e., user configurable property allowing the user to only restart containers which have more than one replicas).

Containers are lighter-weight than VMs and hence the number of containers typically hosted in a server is much larger (few hundreds to thousands). This unique feature associated with containers make it reasonable to consider top k number of containers in each step as opposed to a single VM in typical VM rebalancing algorithms. Choice of value for k can depend on, e.g., how heavy weighted containers are, and how many containers can tolerate being migrated for balancing, total number of containers in the cluster. In general, value of k is more than one.

Cost associated with migrating VMs is significantly larger than cost of stopping/restarting containers. The cost referred herein relates to compute cycles and network traffic. The balancing scheme described herein, thus is able to not factor in the cost to stop and restart containers.

VMs cannot be migrated between infrastructure back-ends such as Amazon Web Services, Azure and VSphere environments because of the difference in underlying virtualization technologies. However, containers can be stopped and restarted across these environments. As a result, the container management schemes enables users to achieve reduced load-imbalance not only across hosts on a single backend but also when hosts span multiple back-ends.

Figure 4:
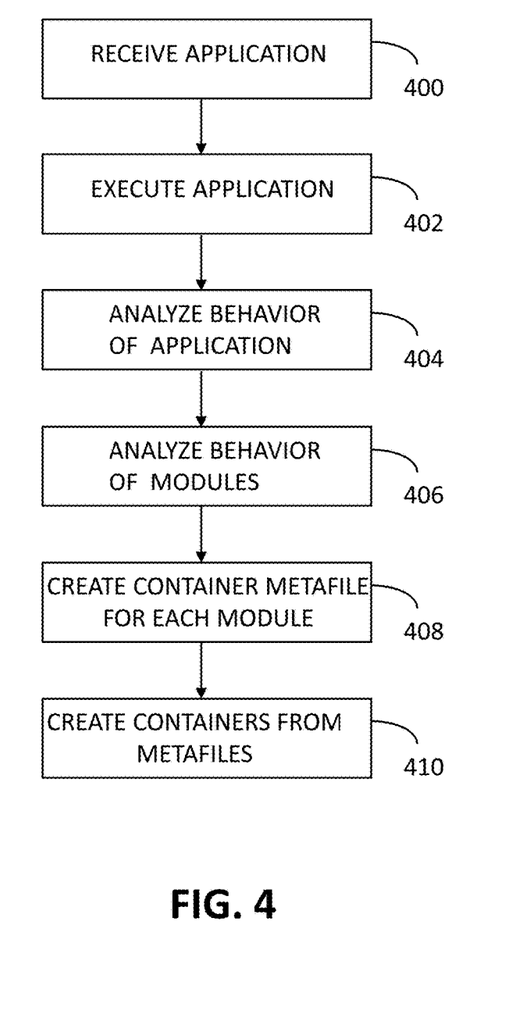
FIG. 4 illustrates processing operations associated with an embodiment of an application ingestion engine, in accordance with some embodiments of the disclosure.

Returning to FIG. 1, the memory 140 of server 104_1 also stores an application ingestion engine 145. The application ingestion engine (AIE) provides application migration capabilities into containers. The AIE receives an application, and is able to transform the received application into a container. In some sense, a container is a combination of binaries, configuration, and state. The AIE intelligently analyzes the binaries, and if given access to a running version of the application (possibly running in a virtual machine), the AIE can determine the configuration of the container to be created. The analysis of the application can include maintaining a signature database of applications. To determine state of the container to be created, interactions across multiple components or modules of the application can be determined and analyzed. The AIE can be particularly beneficial for containerizing applications for which an enterprise lacks source code or other application-specific knowledge (e.g., no developers who could break the application into container parts). Processing associated with an embodiment of the AIE 145 is shown in FIG. 4.

An application is received 400. That is, the AIE receives from the user an executable file/program/application making up a monolithic application. In some cases, the AIE receives from the user a definition of the set of executable files/programs/applications making up a distributed application. In the case of a monolithic (single executable) application, the entire application comprises one module. In the case of a distributed application, the user supplies a list of executable modules comprising the application. A user may upload one or more binaries to the AIE via a user interface.

Prior to executing the application, the AIE may perform static analysis of the application. In one example, the AIE receives a .Net app, and the AIE can create Linux or Windows containers based on the .Net app received. The .Net runtime is open source, and the resulting containers can run in both Linux and Windows. The AIE analyzes the bytecode and determines based on the bytecode whether to run the app as Linux or Windows containers. The following is (pseudo) bytecode for two applications. For APPLICATION #1, the bytecode is pure managed code and does not have any platform dependent code. This application can be run on both Linux and Windows. For APPLICATION #2, the bytecode loads a Windows specific library, e.g., "user32.d||" which may not be available on Linux. The AIE may determine that the application can be run on Windows only.

---
APPLICATION #1
---
.method static void Main( ) {
  .entrypoint
  .maxstack 1
  ldstr "ContainerX!"
  call void [mscorlib]WriteLine(string)
  ret
}
---

---
APPLICATION #2
---
.method static void Main( ) {
  .entrypoint
  .maxstack 1
  ldstr "ContainerX!"
  [DllImport("user32.dll")]
  call void [user32]MessageBox(0, string)
  ret
}
---

Next, the application is executed 402 by one or more processors of a host system, e.g., for runtime analysis of the application. The static analysis portion of the scheme may dictate whether the application is executed in Linux or Windows. The application is executed while its behavior is being monitored. This may be accomplished using several methods. For example, on Linux/UNIX machines, the ptrace/systrace/ktrace facility can be used to log an application's system call trace, which describes its interaction with the host system and other applications of the host system. On Windows machines, a minifilter "Activity Monitor" driver may be employed to gather similar information.

The behavior of the application is then analyzed 404. The analysis determines the composition of the application, which can include one or more modules. The one or more modules may be connected to or cooperates with each other, and the modules can be interconnected like a graph of modules. For instance, the application may be a Web application comprising a Web Tier (e.g., a front end module), Business Logic Tier or Application Tier (e.g., a back end module), a Database Tier (e.g., a database module). An application comprising two cooperating modules may be identified by examining the IPC (inter process communication) or socket-based communication system calls observed in block 402. The direction of each interaction can be logged, and a catalog of modules created based on the analysis performed. A graph can be defined based on the interaction, the direction of the interaction, and the catalog of modules. Other categorizations of module boundaries can be used.

The behavior of each module is then analyzed 406. The behavior of the module is analyzed to determine its dependencies, or resource requirements. The dependencies referred here could include links to data files, configuration files, and libraries. Depending on the application, the dependencies may refer to local resources or remote resources. For example, libraries or configuration files accessed by the module may be identified by examining the open/close/read/write system calls observed in block 402.

A container metafile is created for each module 408. That is, a container metafile having the resource requirements established in block 406 is created for each module. The dependencies or resource requirements can translate to the construction of a container metafile according to the following:

If the module dependencies included the use of a library, the use of a library would correspond to the installation of the corresponding package as a step within the container metafile.

If the module dependencies included access to a remote storage location, then the container metafile may mount the same remote storage location to the container's filesystem.

If the module dependencies included access to certain files in the host file-system, then these files could either be copied to the container's file system or the files could be mounted within the container's file system.

Finally, containers are created from the container metafile 410 generated for each module. An application metafile may be created which references one or more containers created in block 410. Consider the case when an application comprises a number of modules and each module corresponds to a separate container. In this case, each module is described by a container metafile. The relationship between these modules as determined by the step 404 "Analyze behavior of application", is captured in an application metafile (for. e.g. docker-compose file). As an example of how a relationship can be captured by the application metafile:

If one module (or container) communicates with another module (or container) that will be executing on the same host system, the concept of "links" can be used to enable one module (or container) to address the other.

If one module (or container) communicates with another module (or container) that could potentially execute on another host in a cluster, the concept of internal DNS can be used.

Memory 140 also stores a container studio 146. The Container Studio (CS) 146 is a tool that provides a graphical way for developers to build containerized applications. It offers a visual interface similar to an artist's paint program, allowing executable programs to be "drag-and-dropped" into a canvas. Each application's inputs and outputs (e.g., files or network connections) can be categorized in a similar way to that of the AIE 145. For each input and output or resource dependency identified, a visual connection can be made between the resource and a visual endpoint indicator in the CS UI. Once all inter-dependencies have been satisfied, a containerized version of the application(s) can be made, suitable for deployment into the management platform 142.

Note that the CS UI essentially replaces the need for manual creation of the container metafile, with the added benefit of being able to identify (via some parts of the AIE engine) dependencies. The difference between what the full AIE workflow does and what the CS workflow does is in the fact that AIE attempts to answer the interdependency questions by virtue of analyzing the interaction of the various modules as the application executes, while CS defers that decision to the developer.

Figure 5:
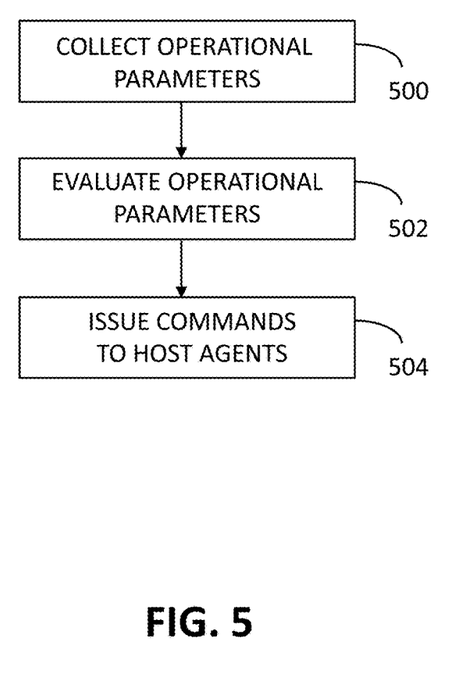
FIG. 5 illustrates processing operations associated with container management, in accordance with some embodiments of the disclosure.

FIG. 5 illustrates processing operations associated with container management, in accordance with some embodiments of the disclosure. Container management may include implementing limits and priorities on container pools as well as container balancing. In block 500, a management platform collects operational parameters from a plurality of host agents operating on respective host machines in a cluster. In block 502, the management platform evaluates the operational parameters in accordance with metrics associated with container pools, wherein each container pool includes a plurality of containers. In block 504, the management platform issue commands to the plurality of host agents, wherein the commands include operating system commands enforced at a container to facilitate operation of the cluster in accordance with the metrics associated with container pools.

In some embodiments, the cluster is divided into the container pools (as seen in FIG. 3), and each container pool includes a sub-set of computation resources in the cluster. Each container may include a segment of hardware resources associated with a host machine, a segment of an operating system utilized by the host machine in the cluster, and at least one application.

In some embodiments, the metrics associated with a given container pool includes a priority level and computation resource limits. Preferably, the computation resource limits associated with all of the container pools in the cluster sums up to over 100 percent utilization of resources in the cluster.

In some embodiments, the management platform responds to queries from the host agents for updated metrics associated with the container pools.

In some embodiments, the management platform issuing commands to the host agents by providing resource limits to a host agent to enable the host agent to ascertain a desired resource target based on current and past utilization and apply a corrective measure to achieve the desired resource target. The host agent is configured to apply hysteresis correction by varying refresh rates and/or alter an amount by which resource utilization is corrected on each iteration.

In some embodiments, the management platform may determine whether a current imbalance value of the cluster is over a threshold, and select a K number of containers to be stopped on a first host machine (source host) and restarted on a second host machine (destination host). Depending on a user configurable parameter, the K number of containers selected comprises containers that have more than one replicas. The imbalance value can be determined based on the operation parameters by determining resource usage deviation for each host machine, wherein deviation is defined by host usage minus the average host usage of the cluster, and determining the imbalance value of the cluster, wherein imbalance is defined as 1 divided by the number of host machines in the cluster multiplied by sum of squares of resource usage deviations. The second host machine (destination host) may have a lowest resource usage deviation.

Various steps are taken to determine whether the K number of containers should be or can be migrated. The management platform can evaluate a new imbalance value as if the K number of containers are stopped on the first host machine and restarted on the second host machine, and determine whether the new imbalance value improves over the imbalance value. Depending on one or more conditions or constraints, the management platform can cause one or more ones of the K number of containers to be stopped on the first host and restarted on the second host. If the second host is not a suitable destination host, the management platform can select the K number of containers to be stopped on the first host machine and restarted on a third host machine (a different destination host). Depending on the one or more conditions or constraints (e.g., if imbalance will not improve), the management platform can select a K−1 number of containers to be stopped on the first host machine and restarted on the second host machine. Because the scheme concerns containers and not virtual machines, the imbalance value calculation does not factor in the cost to stop and start containers.

An embodiment of the present disclosure relates to a computer storage product with a non-transitory computer readable storage medium having computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the disclosure may be implemented using JAVA®, C++, or other object-oriented programming language and development tools. Another embodiment of the disclosure may be implemented in hardwired circuitry in place of, or in combination with, machine-executable software instructions.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

In other aspects, systems for implementing the methods described herein are provided. Moreover, a computer program for carrying out the methods described herein, as well as a non-transitory computer readable storage-medium storing the computer program are provided. A computer program may, for example, be downloaded (updated) to the existing network devices and systems (e.g. to the existing routers, switches, various control nodes and other network elements, etc.) or be stored upon manufacturing of these devices and systems.

As will be appreciated by one skilled in the art, aspects of the present disclosure, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s) having computer readable program code embodied, e.g., stored, thereon.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the symmetric routing operations thereof. This may be inclusive of appropriate algorithms and communication protocols that allow for the effective exchange of data or information.

As used herein, the term "packet" (which may be used interchangeably with the term "message") refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, inter process communications, shared memory, etc. The term "message" is used generically herein to describe a piece of information which may or may not be, but is typically communicated via one or more communication mechanisms of any type.

In one implementation, network elements implementing the methods described herein may include software to achieve (or to foster) the functions discussed herein, where the software is executed on one or more processors to carry out the functions. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, network elements implementing the functionalities as described herein may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable symmetric routing disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in providing the functionalities as outlined herein. Additionally, each of these devices may include a processor that can execute software or an algorithm to perform the activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of ensuring symmetric routing, as potentially applied to a myriad of other architectures.

It is also important to note that the steps of methods/algorithms described herein illustrate only some of the possible scenarios that may be executed by, or within, an environment described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for managing containers in a cluster, the method comprising:
    collecting operational parameters from a plurality of host agents operating on respective host machines in the cluster;
    evaluating the operational parameters in accordance with metrics associated with container pools, wherein each container pool includes a plurality of containers;
    issuing commands to the plurality of host agents, wherein the commands include operating system commands enforced at a container to facilitate operation of the cluster in accordance with the metrics associated with container pools;
    determining whether a current imbalance value of the cluster is over a threshold;
    identifying a first host machine from the host machines in the cluster for container-balancing;
    selecting a first number of containers on the first host machine based on maximum resource usage, wherein the first number of containers is selected only from containers that have two or more replicas; and
    stopping the first number of containers on the first host machine and restarting the first number of containers on a second host machine, wherein the second host machine is different than the first host machine.

2. The method of claim 1, wherein:
the cluster is divided into the container pools; and
each container pool includes a sub-set of computation resources in the cluster.

3. The method of claim 1, wherein:
each container includes a segment of hardware resources associated with a host machine, a segment of an operating system utilized by the host machine in the cluster, and at least one application.

4. The method of claim 1, wherein:
the metrics associated with a given container pool include a priority level and computation resource limits.

5. The method of claim 4, wherein:
the computation resource limits associated with all of the container pools in the cluster sums up to over 100 percent utilization of resources in the cluster.

6. The method of claim 1, further comprising:
responding to queries from the host agents for updated metrics associated with the container pools.

7. The method of claim 1, wherein issuing commands to the host agents comprises:
providing resource limits to a host agent to enable the host agent to ascertain a desired resource target based on current and past utilization and apply a corrective measure to achieve the desired resource target.

8. The method of claim 7, wherein the host agent is configured to apply hysteresis correction by varying refresh rates and/or alter an amount by which resource utilization is corrected on each iteration.

9. The method of claim 1, further comprising:
determining a subset of the first number of containers that have placement constraints satisfied by the second host machine.

10. The method of claim 9, wherein upon determining that the subset of the first number of containers is empty, selecting a new host machine on which the first number of containers are to be restarted.

11. The method of claim 1, wherein the current imbalance value is determined based on the operation parameters by determining resource usage deviation for each host machine, wherein deviation is defined by host usage minus an average host usage of the cluster, and determining the current imbalance value of the cluster, wherein imbalance is defined as 1 divided by a number of host machines in the cluster multiplied by a sum of squares of resource usage deviations.

12. The method of claim 11, wherein the second host machine has a lowest resource usage deviation.

13. The method of claim 1, further comprising:
evaluating a new imbalance value as if the first number of containers are stopped on the first host machine and restarted on the second host machine; and
determining whether the new imbalance value improves over the current imbalance value.

14. The method of claim 13, further comprising:
restarting one or more ones of the first number of containers on the second host machine.

15. The method of claim 13, further comprising:
selecting the first number of containers to be stopped on the first host machine and restarted on a third host machine.

16. The method of claim 13, further comprising:
selecting a second number of containers to be stopped on the first host machine and restarted on the second host machine, wherein the second number of containers is one less than the first number of containers.

17. The method of claim 1, wherein determining the current imbalance value does not factor in the cost to stop and restart containers.

18. A platform for managing containers in a cluster, the platform comprising:
one or more non-transient storage media for storing instructions for managing containers; and
one or more processors operable to execute the instructions to:
collect operational parameters from a plurality of host agents operating on respective host machines in a cluster;
evaluate the operational parameters in accordance with metrics associates with container pools, wherein each container pool includes a plurality of containers;
issue commands to the plurality of host agents, wherein the commands include operating system commands enforced at a container to facilitate operation of the cluster in accordance with the metrics defined for container pools;
determine whether a current imbalance value of the cluster is over a threshold;
identify a first host machine from the host machines in the cluster for container-balancing;
select a first number of containers on the first host machine based on maximum resource usage, wherein the first number of containers is selected only from containers that have two or more replicas; and
stop the first number of containers on the first host machine and restart the first number of containers on a second host machine, wherein the second host machine is different than the first host machine.

19. One or more non-transient computer-readable media having instructions stored thereon, when executed by one or more processors the instructions implement the following operations:
collecting operational parameters from a plurality of host agents operating on respective host machines in a cluster;
evaluating the operational parameters in accordance with metrics associated with container pools, wherein each container pool includes a plurality of containers;
issuing commands to the plurality of host agents, wherein the commands include operating system commands enforced at a container to facilitate operation of the cluster in accordance with the metrics defined for container pool;
determining whether a current imbalance value of the cluster is over a threshold;
identifying a first host machine from the host machines in the cluster for container-balancing;
selecting a first number of containers on the first host machine based on maximum resource usage, wherein the first number of containers is selected only from containers that have two or more replicas; and
stopping the first number of containers on the first host machine and restarting the first number of containers on a second host machine, wherein the second host machine is different than the first host machine.

20. The one or more non-transient computer-readable media of claim 19, wherein:
the metrics associated with a given container pool includes computation resource limits; and
the computation resource limits associated with all of the container pools in the cluster sums up to over 100 percent utilization of resource in the cluster.

21. The one or more non-transient computer-readable media of claim 19, wherein the instructions further implement the following operations
evaluating a new imbalance value as if the first number of containers are stopped on the first host machine and restarted on the second host machine; and
determining whether the new imbalance value improves over the current imbalance value.

22. The platform of claim 18, wherein the one or more processors are further operable to execute the instructions to:
evaluate a new imbalance value as if the first number of containers are stopped on the first host machine and restarted on the second host machine; and
determine whether the new imbalance value improves over the current imbalance value.

23. The platform of claim 22, wherein the one or more processors are further operable to execute the instructions to:
select a second number of containers to be stopped on the first host machine and restarted on the second host machine, wherein the second number of containers is one less than the first number of containers.

* * * * *

UNITED STATES PATENT AND TRADEMARK OFFICE
CERTIFICATE OF CORRECTION

PATENT NO. : 10,389,598 B2
APPLICATION NO. : 15/336360
DATED : August 20, 2019
INVENTOR(S) : Pradeep Padala et al.

Page 1 of 1

It is certified that error appears in the above-identified patent and that said Letters Patent is hereby corrected as shown below:

In the Claims

Claim 19, Column 22, Line 5, please replace "pool;" with --pools;--

Signed and Sealed this
First Day of October, 2019

Andrei Iancu
*Director of the United States Patent and Trademark Office*